ered by carbon carbonyl iron powder # 2,914,393

PRODUCTION OF NITROGEN-BEARING CARBONYL IRON POWDER

Hans Beller, Watchung, N.J., assignor to General Aniline & Film Corporation, New York, N.Y., a corporation of Delaware No Drawing. Application January 7, 1957
Serial No. 632,656

8 Claims. (Cl. 75—.5)

The invention here presented is a new procedure for improving the magnetic and electrical properties of iron powders, as derived from iron carbonyl, by the presence of substantial quantities of ammonia during the heat decomposition of the carbonyl; the iron powder being characterized by the presence of substantial amounts of combined nitrogen.

Finely powdered iron is readily prepared by the procedure of heat treating iron carbonyl, which breaks down the combination between the iron and the carbon monoxide to throw down the iron in a very finely divided form, usually as very small spherical particles of iron, the liberated carbon monoxide being withdrawn from the reaction vessel. Difficulty is however encountered in the reaction because of the presence of carbon in the precipitated iron. The character of the reaction suggests that 2 moles of carbon monoxide are broken down by a catalytic effect on the surface of the newly precipitated iron particle to yield carbon dioxide and free carbon which is absorbed into the particle of iron as it is thrown down. It has been found that catalytic traces of ammonia added to the reaction and cuts the amount of carbon in the iron powder to approximately one-quarter of what it would otherwise be, thereby improving the quality of the resulting iron powder.

According to the present invention it is now found that if the amount of ammonia is considerably increased by from five to ten times, to an amount different in order of magnitude, another reaction supervenes resulting in a small increase in the amount of carbon deposited with and in the iron, and depositing in the iron substantial amounts of nitrogen, possibly as iron nitride, which results in a very substantial improvement in the electro magnetic properties of the resultant iron, reducing the eddy current loss coefficient to one-quarter that of the ordinary iron powder from iron carbonyl, substantially reducing the average particle size and very greatly increasing the "Q value" at radio frequency; increasing this value by approximately 30%.

Thus the process of the present invention precipitates iron from iron carbonyl by a heat treatment of iron carbonyl in the presence of large amounts of ammonia at a temperature of 250° to 300° C. to produce an iron powder of smaller particle size, very greatly improved eddy current loss coefficient and very greatly improved "Q value." Other objects and details will be apparent from the following description.

The decomposition of iron penta carbonyl vapor is carried out in the free space of a reaction vessel at temperatures of about 250° to 300° C., and the iron particles obtained are always contaminated by carbon resulting from a side reaction which the carbon monoxide, set free in the reaction, undergoes according to the equation $$2\ CO \rightarrow CO_2 + C$$

The iron powder obtained from such an operation consists of spherical particles ranging from 3 to 12 microns in diameter, and contains usually from 1% to 1.2% of carbon primarily in the form of iron carbide. Since such a high carbon content renders the powder practically unusable for magnetic applications, means were developed to suppress or eliminate this side reaction of carbon monoxide to carbon dioxide and carbon, which is possibly catalyzed by the fresh and highly active surface of the individual iron particles formed in the process. It appears that the addition of ammonia gas to the iron carbonyl vapor catalytically suppresses the carbon monoxide conversion and subsequent carburization of the iron powders produced, so that their carbon content becomes much lower. For example, if ammonia gas is added to the iron carbonyl vapor entering the reaction vessel in an amount equal to approximately 5% by volume of the carbon monoxide formed in the reaction, an iron powder is obtained of practically identical particle size and particle size distribution as stated above, but containing only 0.6% to 0.7% of carbon and possessing excellent magnetic properties. An increase in the amount of ammonia gas added to the reaction does not materially increase this catalyst effect, so that, for example, a doubling of the 5% to 10% by volume of ammonia gas in the carbon monoxide leaving the decomposition chamber will have no appreciable effect over the one produced by the lesser amount of ammonia.

The actual effect of the addition of ammonia on the decomposition reaction of iron penta-carbonyl and particularly on the decrease of the carbon content of the resulting iron powder is not too well understood but may be explained by the finding that carbonyl iron powders obtained in the presence of catalytic amounts of ammonia show a nitrogen content of approximately 0.5% to 0.6%. This nitrogen is present in the powders mostly in the form of iron nitride.

In comparison herewith, the nitrogen content of carbonyl iron powders produced in the absence of ammonia gas is practically nil. It may be assumed, therefore, that iron nitride is formed in the presence of ammonia gas and subsequently depresses or retards the catalytic action which the freshly formed and highly active iron surfaces exert with regard to the carbon monoxide conversion, and that consequently a product of lower carbon content is obtained.

This invention is, however, not concerned with the suppression or retarding of a chemical reaction such as the carbon monoxide conversion according to the equation $$2\ CO \rightarrow CO_2 + C$$

or with the prevention, by catalytic means, of the carburization of the iron powder formed in the decomposition of iron penta-carbonyl. Instead, this invention provides a means for producing carbonyl iron powders having improved electromagnetic properties and particularly higher "Q values" than obtained in the prior art by adding certain limited and measured amounts of gases or vapors to the iron penta-carbonyl entering the decomposition chamber.

The iron carbonyl may be prepared by the usual processes and the iron powder may be precipitated from the resulting iron carbonyl compound by the usual methods and apparatus.

In practicing the invention, an amount of ammonia approximately equal to 2 moles per mole of iron pentacarbonyl is added to the stream of iron carbonyl passing to the reactor. The precipitation of the iron powder then occurs at a temperature of 250° to 300° C., in the presence of this large excess of ammonia. The resulting iron powder then shows the very decided improvement in physical and electromagnetic properties desired.

Example 1

The decomposer was run under standard conditions and with the usual throughputs and yields with the sole exception that the amount of ammonia fed through was increased from 0.3 mole per mole of carbonyl to 1.5 moles per mole of carbonyl. The powders were sampled as usual to give the most representative samples and then subjected to the milling, insulating, bonding, molding and measuring procedures which have become the standard way in evaluating these powders for electromagnetic applications. As a result, Q values and effective permeabilities were obtained which are most conveniently presented in relative, that is, percentage, figures. In the following tables these values are given for the two experiments:

| Quantity | Data for 0.3 mols $NH_3$ | Data for 1.5 mols $NH_3$ |
|---|---|---|
| Effective Permeability | 100 | 102 |
| Q value at 30 mc | 100 | 118 |
| Q value at 60 mc | 100 | 115 |

Thus, an increase of 15 and more percent in Q value is obtained concurrently with a 2 percent increase in permeability by using the procedure according to the invention instead of the optimum previously known procedure.

Example 2

The thermal decomposition of iron carbonyl is carried out in accordance with U.S.P. No. 1,759,661 with the following exception: Instead of adding 1.0 c.f.m. ammonia, 4.0 c.f.m. ammonia were added to the same input of iron penta-carbonyl. The resulting powder was examined for its particle size and processed into magnetic cores in identically the same way as the "normal" powder. The results were as follows and show that an entirely different powder was obtained.

| Quantity | Powder According to Invention | Normal Powder |
|---|---|---|
| Average Particle size (microns) (by weight) | 4.5 | 8.0 |
| Q value at 30 mc | 184 | 122 |
| Permeability (effective) | 2.3 | 2.5 |
| Eddy current loss coeff. (ohms/henry, c.p.s.$^2$ ×10$^9$) | 1.2 | 5 |

Thus the procedure of the invention produces a new and valuable type of powdered iron of smaller particle size, low carbon content and relatively substantial nitrogen content characterized by very greatly improved physical and electro magnetic properties.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

The invention claimed is:

1. In the production of iron powder from iron carbonyl, the step of heat precipitating the iron particles from the carbonyl, in the presence of amounts of ammonia within the range between ½ mol. and 4 mols. per mol. of carbonyl gas.

2. A process for producing, directly in the decomposition chamber of a carbonyl-iron decomposer, a carbonyl-iron powder characterized by a substantial uniform particle size and the capability of producing magnetic cores having high Q values at high frequencies of the order of 30 to 60 megacycles per second, comprising the steps in combination of feeding into the decomposer iron-carbonyl vapor and effective amounts of ammonia within the range between 1.5 mols of ammonia vapor per mol of iron-carbonyl fed and four mols of ammonia per mol of iron-carbonyl, and heating at least a portion of the decomposer and the mixture to a temperature of about 250° C.

3. An iron carbonyl powder characterized by an average particle size by approximately 4.5 microns, a carbon content of approximately 0.6 to 0.7% and a nitrogen content of approximately 0.5 to 0.6%, and capable of producing magnetic cores having a Q value of approximately 184, an eddy current loss coefficient of approximately 1.2.

4. In the production of nitrogen-containing iron powder from iron carbonyl, the step of heat precipitating the iron particles from the carbonyl compound in the presence of amounts of ammonia within the range between ½ mol and 4 mols per mol of carbonyl gas.

5. An article of manufacture comprising an iron powder having a particle size of approximately 4.5 microns and containing 0.5 to 0.6% of nitrogen.

6. An article of manufacture comprising an iron powder having a particle size of approximately 4.5 microns and containing 0.5 to 0.6% of nitrogen and approximately 0.6 to 0.7% of carbon.

7. A method of simultaneously reducing the amount of carbon and introducing nitrogen into a carbonyl iron powder comprising the step of heat precipitating the iron from the carbonyl compound in the presence of from 1 mol to 4 mols of ammonia per mol of carbonyl iron.

8. A method of simultaneously reducing the amount of carbon and introducing nitrogen into a carbonyl iron powder comprising the step of heat precipitating the iron from the carbonyl compound at a temperature within the range between 250°C. to 300°C. in the presence of from 1 mol to 4 mols of ammonia per mol of carbonyl iron.

References Cited in the file of this patent

UNITED STATES PATENTS

| | | |
|---|---|---|
| 1,759,661 | Muller et al. | May 20, 1930 |
| 2,508,705 | Beller et al. | May 23, 1950 |
| 2,597,701 | Beller | May 20, 1952 |
| 2,663,630 | Schlecht et al. | Dec. 22, 1953 |
| 2,772,956 | West et al. | Dec. 4, 1956 |